Nov. 18, 1930.                R. W. ALEXANDER                1,781,995
                    STRAINING ATTACHMENT FOR PANS AND KETTLES
                             Filed March 22, 1930
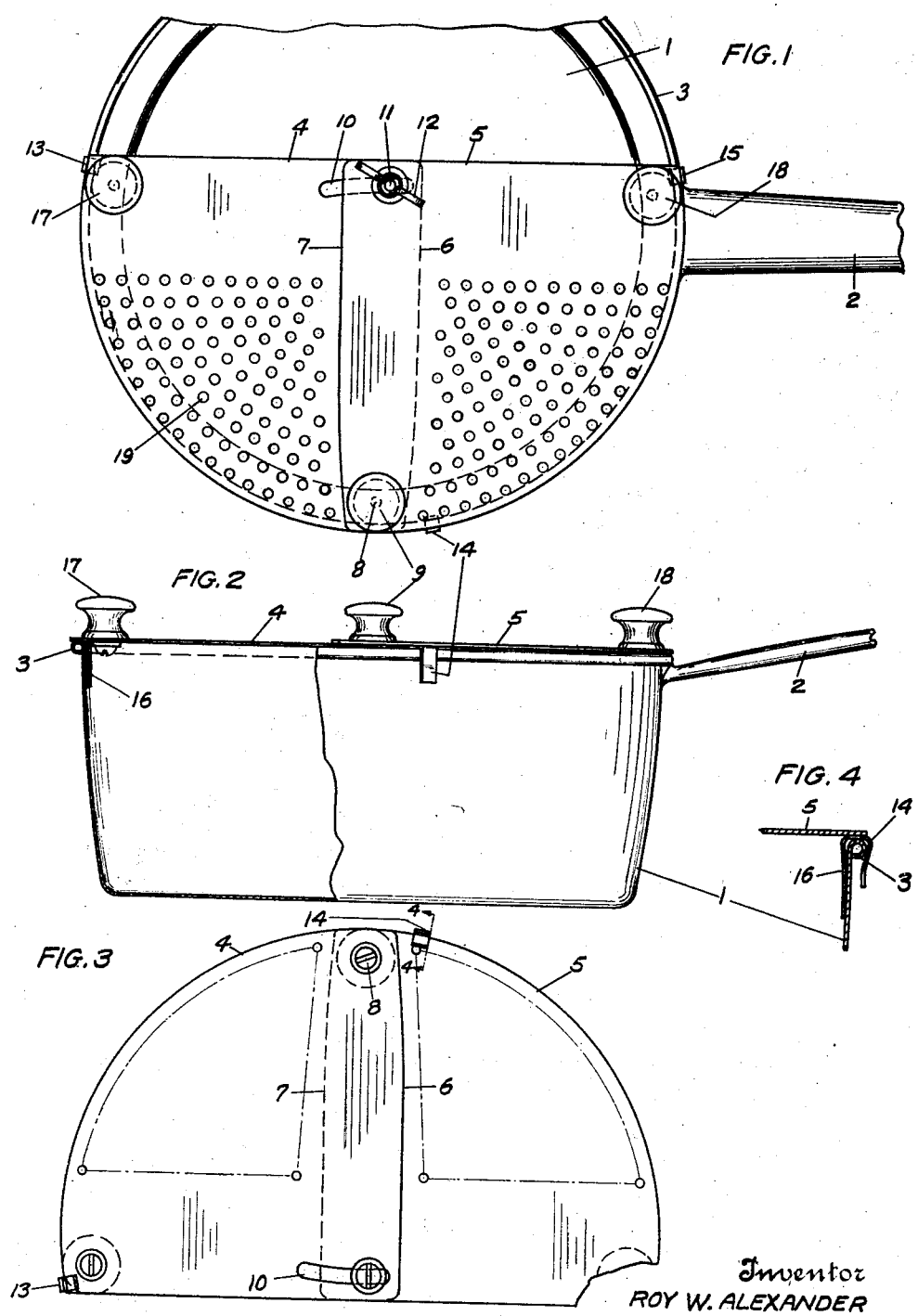
Inventor
ROY W. ALEXANDER
Attorney
A. D. T. Libby Patented Nov. 18, 1930

1,781,995

UNITED STATES PATENT OFFICE

ROY W. ALEXANDER, OF NEWARK, NEW JERSEY

STRAINING ATTACHMENT FOR PANS AND KETTLES

Application filed March 22, 1930. Serial No. 438,028.

This invention relates to an attachment in the form of a cover or semi-cover to be applied to pans, kettles, and the like for the purpose of retaining vegetables within these containers while the water is being drained off.

During the cooking operation, it is usual to use an imperforate cover on the vessel containing the vegetables, and after the cooking is completed this cover is taken off and my attachment put in its place to perform the function above set forth. Therefore, the principal object of my invention is to provide a straining attachment which may be quickly substituted for the regular cover, whereby the water may be quickly drained from the vessel without danger of losing any of the vegetables out of the vessel.

Another object of my invention is to provide a straining attachment which can be quickly adapted for application to pans, kettles, and the like of different sizes within a certain range; that is to say, a small number of sizes of straining attachments built according to my specification, will fit a large number of sizes of pans, kettles, and the like, and it is not necessary to have a straining attachment for each and every size of vessel.

Another object of my invention is to provide a straining attachment which is cheap to manufacture and therefore inexpensive to the user.

My invention will be readily understood by reference to the annexed drawing, wherein:

Figure 1 is a plan view on a reduced scale of a pan such as ordinarily used in cooking vegetables, showing my attachment in place.

Figure 2 is a part-sectional and side-elevational view of Figure 1.

Figure 3 is a bottom view of the straining attachment.

Figure 4 is a sectional view through one of the clips used for holding the attachment in position on the vessel.

Referring now to the details wherein like numbers refer to corresponding parts in the various views, 1 illustrates a cooking pan having a handle 2. As usually constructed, such pans or kettles have a turned-over or reenforced rim 3.

My straining attachment is in the form of a segmental disc composed of two sector-shaped pieces of metal of any suitable material, for example, aluminum. As shown in Figure 1, the segmental disc is somewhat larger than the semi-circular area of the top of the pan, as I do not limit myself to any exact size, but I prefer the size as illustrated for the reason which will be later pointed out.

The two sector-shaped pieces 4 and 5 are arranged in overlapping relationship, the edge of the sector 4 being indicated by the dotted line 6, while the edge of the sector 5 is shown by the full line 7. The two sectors are pivoted together closely adjacent their arcuate edges, as at 8, and this pivot connection may be in the form of a screw which also acts to hold the knob 9 in position. One of the pieces, for example 4, is suitably slotted at 10 to provide a path of travel for a lock screw 11 held in position by a wing nut 12. By this arrangement or an equivalent construction, the two sectors 4 and 5 may be adjusted about the pivot 8 to change the amount of overlap of the sectors, thereby accommodating the straining attachment to pans or kettles of different diameters or to cover different areas.

To hold the straining attachment to the vessel to which it is to be applied, I provide a plurality of clips, three of which are indicated by the numbers 13, 14, and 15. Preferably the clips 13 and 14 are placed closely adjacent what may be termed the free side of the straining attachment, so as to grip the rim 3 of the vessel.

At least one of these clips, for example 14, has the inner leg 16 longer than the outer leg to assist in quickly placing the attachment on the dish to which it is to be applied. By having the inner leg 16 made longer, as shown in Figure 4, the attachment may be swung over the top of the dish and this leg will engage the inner side of the rim of the dish and the attachment is simply pushed downward into position. I find that by making the leg on one of these clips longer than the others, this expedites the application of the attachment materially and there is no objection in making them all in the same manner.

Arranged closely adjacent the clips 13 and 15, are knobs 17 and 18 which may be similar to the knob 9. These knobs are used for manipulating the attachment when placing it on the dish. Both of the sectors 4 and 5 are provided with a plurality of holes or perforations 19 for the purpose of allowing the liquid in the vessel to be poured out while retaining the vegetables within the dish. As will be seen by reference to Figure 1, the holes 19 are arranged on opposite sides of the overlapping portions of the sectors and this causes the liquid to come out of the dish without striking the knob 9 which may be made of wood or other suitable non-metallic material. This prevents the knob from becoming injured by the boiling fluid. Furthermore, I prefer to space the holes 19 below the free edge of the attachment so that there is no danger of the fluid slopping over this edge when the dish is turned to pour out the fluid.

By making the segmental disc slightly larger than a semi-circle, it will be seen that the clip 15 will be positioned on the opposite side of the handle, which prevents the attachment from turning around on a dish of this kind, it being assumed that the attachment is placed on a pan as shown in Figure 1 for use by a right-handed person who would naturally turn the pan anti-clockwise. It is to be noted that the clip 14 is placed on one of the sectors, for example 5, to one side of the pivot point 8. This is essential in order that the other sector 4 may be adjusted with respect to the sector 5 to fit a pan or kettle of different diameter than that shown. The slot 10 provides an adjustment to cover a certain range all as previously pointed out.

It will be understood that my invention is susceptible to certain changes in the details without departing from the spirit of my invention or the scope of the appended claims.

Having thus described my invention, what I claim is:

1. A straining attachment for pans, kettles and the like comprising two sector-shaped metal pieces pivoted together in overlapping relationship, the pivot being near the arcuate edges of said pieces, said pieces being provied with means located substantially diametrically opposite to said pivot for changing the amount of overlap for the purpose described, a plurality of clips positioned on one side of said sectors for engaging the rim of a pan, kettle or the like, and knobs on the opposite side of the sectors from said clips for manipulating the attachment, said sectors having a plurality of drain holes therein.

2. A straining attachment for pans, kettles and the like comprising two sector-shaped metal pieces pivoted together in overlapping relationship, the pivot being near the arcuate edges of said pieces, said pieces being provided with means located substantially diametrically opposite to said pivot for changing the amount of overlap for the purpose described, a clip located at the free corner of each sector and another clip located on one of the sectors adjacent said pivot, and means carried on the sectors for manipulating the same, said sectors having a plurality of holes to one side of the overlapping portions.

3. A straining attachment for pans, kettles and the like comprising two sector-shaped metal pieces pivoted together in overlapping relationship, the pivot being near the arcuate edges of said pieces, said pieces being provided with means located substantially diametrically opposite to said pivot for changing the amount of overlap for the purpose described a clip located at the free corner of each sector and another clip located on one of the sectors adjacent said pivot, said clips being U-shaped and at least one of them having its inner leg longer than the other, and means carried on the sectors for manipulating the same, said sectors having a plurality of holes to one side of the overlapping portions.

In testimony thereof, I affix my signature.

ROY W. ALEXANDER.